July 4, 1967 — F. G. KITCHEN — 3,329,302
CANS
Filed Dec. 11, 1964 — 3 Sheets-Sheet 1

Inventor
FREDERICK GEORGE KITCHEN

By Mason, Porter, Diller & Stewart
Attorneys

July 4, 1967  F. G. KITCHEN  3,329,302
CANS

Filed Dec. 11, 1964  3 Sheets-Sheet 2

FREDERICK GEORGE KITCHEN
Inventor

By Mason, Porter, Diller & Stewart
Attorneys

July 4, 1967 F. G. KITCHEN 3,329,302
CANS

Filed Dec. 11, 1964 3 Sheets-Sheet 3

*Inventor*
FREDERICK GEORGE KITCHEN
By
Mason, Porter, Diller & Stewart
*Attorneys*

United States Patent Office  3,329,302
Patented July 4, 1967

3,329,302
CANS
Frederick G. Kitchen, North Ferriby, England, assignor to The Metal Box Company Limited, London, England, a British company
Filed Dec. 11, 1964, Ser. No. 417,721
Claims priority, application Great Britain, Dec. 13, 1963, 49,421/63
10 Claims. (Cl. 220—42)

This invention relates to cans, and particularly to cans for containing a liquid, for example paint, of the kind in which the can is arranged to be closed by a lid.

As is well understood, the purpose of a can of the kind above-mentioned is to preserve a very tight seal between the lid and the can. Ideally, the best seal would be obtained by line contact between two cylinders whose axes are parallel but in designing cans the best seal which can be obtained is one in which there is line contact between a cylinder and a plane. Because of this it has, heretofore, been necessary when removing the lever lid from a can progressively to lever round the lid because the effect of levering the lid upwards at any one position around its circumference is to increase the interference between the lid and the ring, the increase in interference being proportionate to the angle through which the lid is levered.

It is a main object of the present invention to provide a can of the kind above-mentioned which gives a seal comparable with that of the known kinds of can but the lid of which can be removed by levering thereof at one position only.

According to the invention there is provided a can and a lid therefor having a depending skirt, wherein the can has a cylindrical neck provided with a mouth-ring defined by a protrusion of slightly greater external diameter than the internal diameter of the skirt of the lid, the difference between said external and internal diameters, the radial clearance between the skirt and the cylindrical neck, the internal depth of the skirt, and the natural rigidity of the skirt and mouth-ring being so selected that when the lid has been applied to the can and is displaced by a lever, applied beneath any point on the circumference of the rim of the lid, the interference fit between the skirt and said protrusion is eliminated.

Figure 1:
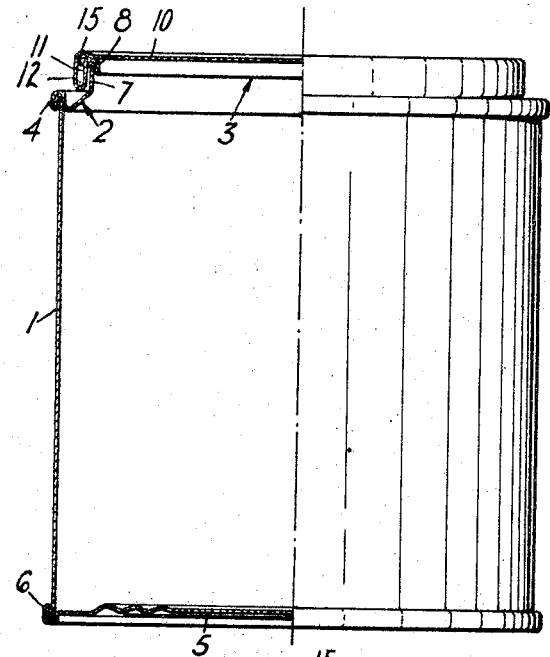
Figure 2:
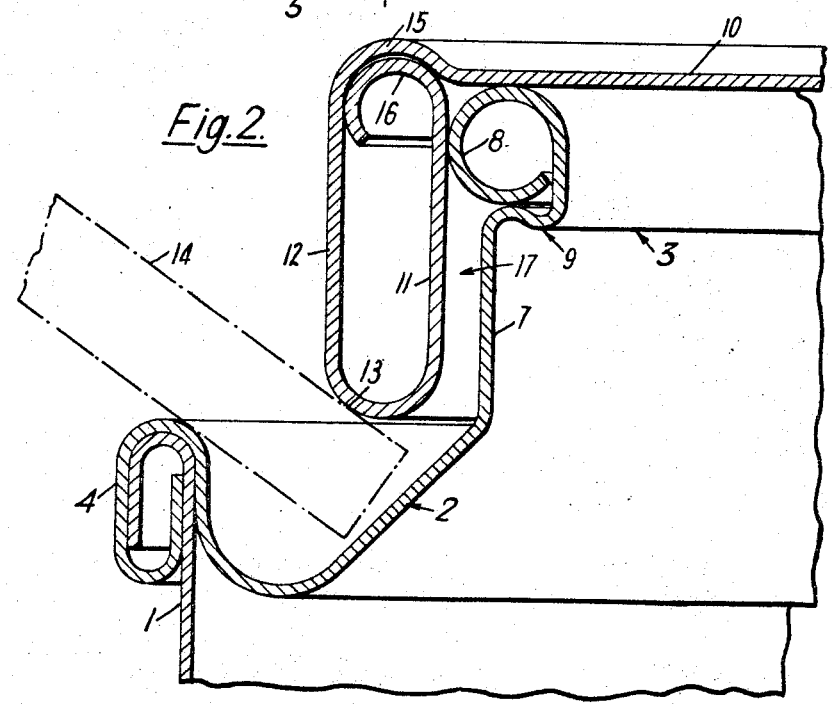
Figure 3:
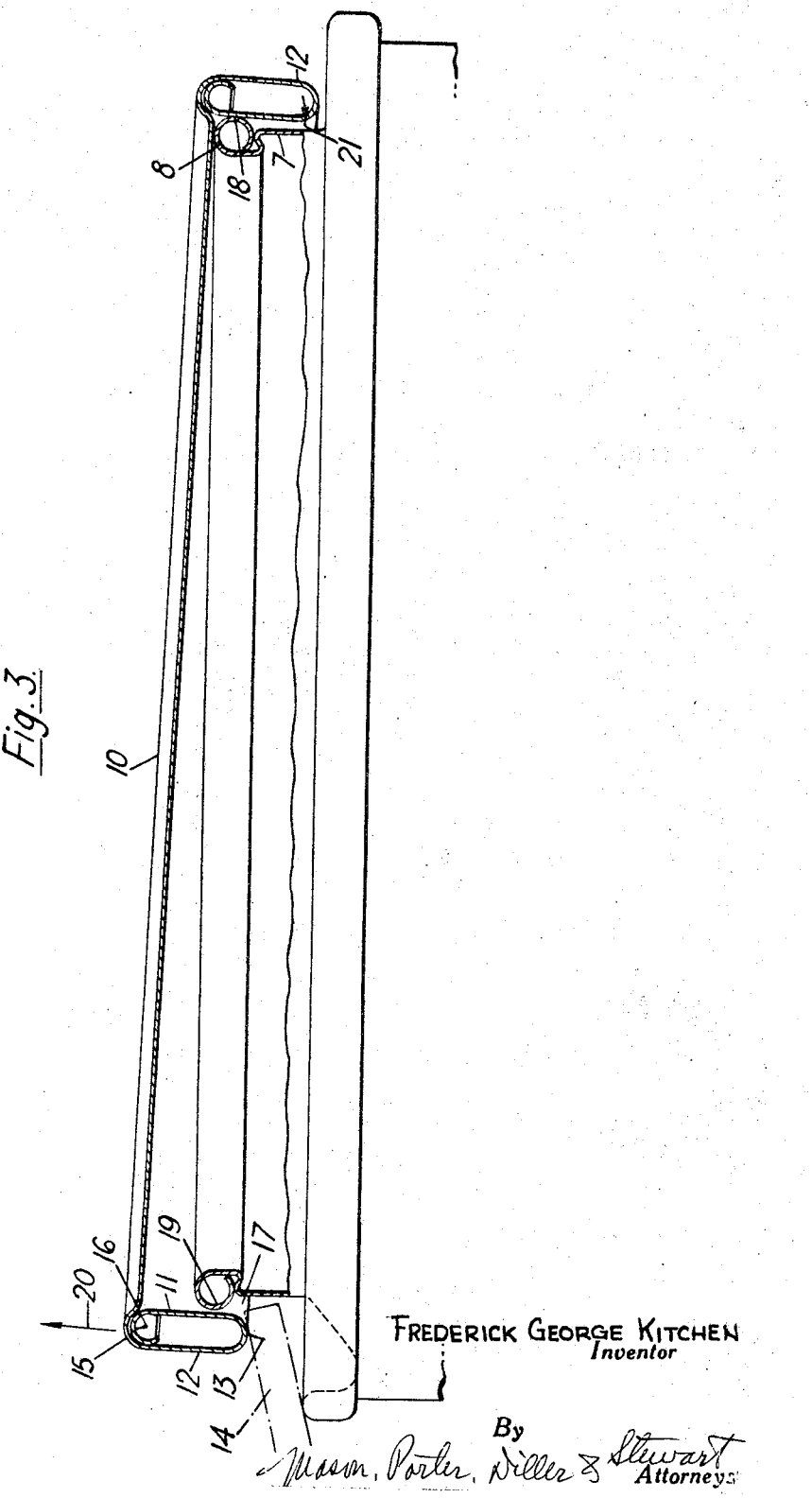

In order that the invention may be clearly understood some embodiments thereof will now be described, by way of example, with reference to the accompanying drawings, in which:

FIGURE 1 is an elevation in half-section through a can according to the invention, FIGURE 2 is a section to enlarged scale of a part of FIGURE 1, FIGURE 3 is a view illustrating the manner in which the lid is removed from the can, the lid having been partly raised by a lever applied thereto, FIGURES 4 to 7 illustrate diagrammatically alternative forms of mouth-ring, and FIGURES 8 to 11 illustrate diagrammatically alternative forms of lid.

In the drawings like reference numerals refer to like or similar parts.

Referring to FIGURES 1 and 2, the can comprises a can body 1 the top of which is provided with a mouth-ring 2 which defines the mouth 3 of the can and which is arranged to be closed by any one of the lids described below. The mouth-ring 2 is connected to the body 1 in the usual manner by a seam 4 and the bottom 5 of the can, FIGURE 1, is connected to the body by a seam 6.

The mouth-ring is provided on a cylindrical neck 7 having at or adjacent the mouth 3 a protrusion 8 the diameter of which is greater than that of the internal diameter of the skirt, described below, of the lid, thereby to effect a seal between the lid and the mouth-ring when the lid is applied to the can. The relationship between the protrusion and the internal diameter of the skirt of the lid is determined by the actual design of the components and the thickness of the sheet metal used in their manufacture. In the embodiment of the invention shown in FIGURES 1 and 2 the interference between the protrusion and the skirt of the lid is in the range 0.010 to 0.020 inch. As shown in FIGURES 1 and 2 the protrusion 8 consists of a curl defining the mouth of the neck portion and the curl is an out-turned curl connected with the neck 7 by a substantially S-shaped portion 9 of the neck ring. The curl is a substantially circular curl and the neck 7 extends substantially radially from the curl.

The lid comprises a crown 10 and a skirt which depends from the crown. As shown in FIGURES 1 and 2, the skirt consists of inner and outer annular walls 11, 12 disposed in spaced radial relation substantially parallel with the longitudinal axis of the lid, and the walls 11, 12 are connected at the ends thereof remote from the crown 10 by a rim 13 engageable as described below by a lever 14. The wall 12 has the opposite end thereof connected with the crown 10 and as shown in FIGURES 1 and 2 this connection is effected by an arcuate portion 15. That end of the wall 11 which is nearest the crown 10 is inturned towards the wall 12 and is closed to the wall 12. As shown in FIGURES 1 and 2 the internal portion consists of a partial curl 16 a part of which is nested in the arcuate portion 15 of the lid.

When the lid is applied to the can to effect closing thereof an annular space or radial clearance 17 is provided between the inner wall 11 of the lid and the neck 7 and a seal is effected between the protrusion 8 and the curved plane of the wall 11, these two faces being maintained in contact by virtue of the interference fit between the diameter of the protrusion 8 and wall 11. This feature assists mechanical application of the lid to a container.

To remove the lid the lever 14, for example a coin, is applied between the top of the seam 4 and the rim 13 of the lid and the lid is pressed upwards and outwards by the lever. During the upward and outward movement of the lid the interference fit between the wall 11 and the protrusion 8 slackens. This is due to the fact that the lid, during its upward movement, is in effect hinged about the contact point 18, FIGURE 3, between the wall 11 and the protrusion 8 at a position diametrically opposite the position of application of the lever 14. This means that the wall 11 immediately above the position of application of the lever 14 is being moved away from the position 19 on the protrusion 8 along a curved path 20 generated by an arc struck from the point 18 about which the lid is hinged and the portion 21 of the skirt which is directly below and most remote from the hinge point 18 moves towards the neck 7. The combination effect of the internal diameter of the skirt wall 11, the internal depth of the lid, the initial interference fit between the wall and protrusion 8, the radical clearance 17 between wall 11 and the neck 7, and the natural rigidity of the lid and the mouth-ring, ensures that the portion 21 of the lid is, on upward levering of the lid by the lever 14, free to move towards the neck 7, as just described, until both the wall 11 and the protrusion 8 have fully restored to their natural positions, thus eliminating the interference fit between the wall 11 and protrusion 8, at which point complete removal of the lid can be readily effected by hand.

Figure 4:
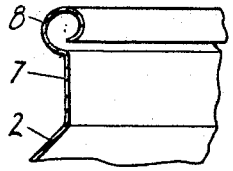
Figure 5:
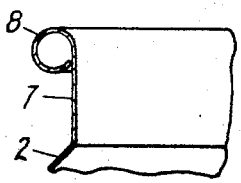
Figure 9:
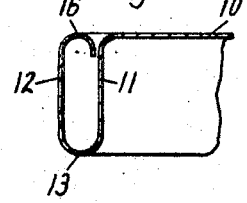
Figure 6:
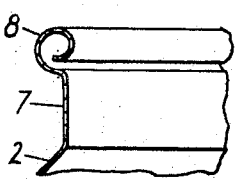
Figure 7:
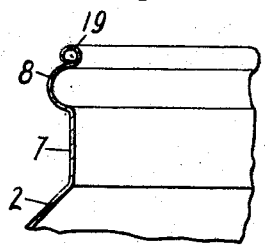
Figure 11:
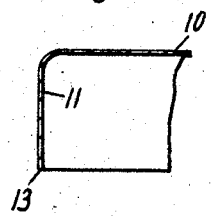

Referring to FIGURES 4 to 7, the mouth-ring of FIGURE 4 is similar to that of FIGURES 1 and 2 but the protrusion 8 consists of an internal curl. In FIGURE 5 the protrusion 8 consists of an out-turned curl in respect of which the neck portion is substantially tangential, and in FIGURE 6 the protrusion 8 is an inturned curl with which the neck 7 is substantially tangential. In FIGURE 7 the protrusion 8 is an external bead formed in the neck 7 and the mouth of the can is defined by a curl 19.

Figure 8:
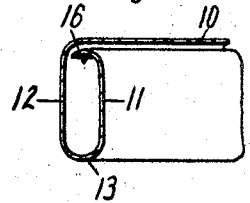
Figure 10:
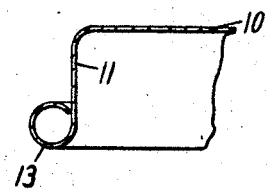

Referring to FIGURES 8 to 11, the lid of FIGURE 8 is similar to that of FIGURES 1 and 2 but the crown of the lid is flat. The lid of FIGURE 9 has the inner wall 11 connected to the crown of the lid and the partial curl 16 is formed on the wall 12. In FIGURE 10 the skirt of the lid consists of one wall only with a rim 13 defined by a curl and in FIGURE 11 the skirt also consists of a single wall and the rim 13 is a "raw" edge.

It is found that by constructing the mouth-ring and lid of a can in the manner above described, and with any combination rings and lids as herein described with reference to the drawings, it is possible to remove the lid by applying the lever 14 to one position only instead of, as has been necessary with liquid-filler cans fitted with lever-type lids prior to the invention, having to apply the lever progressively around the lid.

I claim:

1. A container and a closure therefor, said closure being defined by an end panel and a depending peripheral skirt terminating in a peripheral edge portion, said peripheral skirt having a right-cylindrical wall portion of a predetermined diameter defining a first sealing surface, said peripheral skirt also having a predetermined length as measured axially between said end panel and said edge portion, said right-cylindrical wall portion extending substantially from said end panel to said edge portion, said container being defined in part by an upper body portion joined by an annular wall portion to an upstanding neck, said neck having an uppermost terminal end and an adjacent lower wall portion, said terminal end having a predetermined major diameter greater than the diameter of said right-cylindrical wall portion and defining a second sealing surface in sealing engagement with said first sealing surface, said lower wall portion having a predetermined diameter substantially less than the diameter of said right-cylindrical wall portion and said last-mentioned wall portion being in axial overlapping relationship to said lower wall portion thereby defining an annular gap between said last two-mentioned wall portions, and an annular space between said edge portion and said annular wall portion for receiving an element to apply an upward and outward force to said peripheral edge portion at any predetermined point along the periphery of the closure for progressively unsealing said sealing surfaces beginning at an axially adjacent point of contact between the sealing surfaces by the pivoting of the closure about a point of contact between said sealing surfaces diametrically opposite said first mentioned point of contact and corresponding radial inward movement of said peripheral edge portion adjacent said pivoting point.

2. The container and closure as defined in claim 1 wherein said terminal end includes peripheral reinforcing means.

3. The container and closure as defined in claim 2 wherein said terminal end is in the form of a curl.

4. The container and closure as defined in claim 1 wherein said terminal end is in the form of an inwardly concavely opening peripheral bead.

5. The container and closure as defined in claim 1 including an intermediate generally S-shaped wall portion joining said annular wall portion to said upstanding neck.

6. The container and closure as defined in claim 1 wherein said closure includes a second peripheral skirt in generally spaced parallel relationship to said first-mentioned peripheral skirt, and said edge portion joins said first and second peripheral skirts.

7. The container and closure as defined in claim 1 wherein said closure includes a second peripheral skirt in generally spaced parallel relationship to said first-mentioned peripheral skirt, said edge portion joins said first and second peripheral skirts, and an annular wall portion joins said second peripheral skirt to said end panel.

8. The container and closure as defined in claim 1 wherein said sealing surfaces define the sole sealing means between said closure and said container.

9. The container and closure as defined in claim 1 wherein said upper body portion is joined to said annular wall portion by a peripheral seam, and said annular wall portion is provided with an axially upwardly opening annular channel portion defining an access area for receiving the force applying element.

10. The container and closure as defined in claim 9 wherein said sealing surfaces define the sole sealing means between said closure and said container.

References Cited

UNITED STATES PATENTS

| 2,019,376 | 10/1935 | Wilhelm | 220—42 |
| 2,535,840 | 12/1950 | Coyle et al. | 220—42 |
| 2,585,180 | 2/1952 | Smith | 220—42 |

FOREIGN PATENTS 301,303  8/1954  Switzerland.

THERON E. CONDON, Primary Examiner.

JAMES B. MARBERT, Examiner.